United States Patent
Fanara

(10) Patent No.: US 9,463,816 B2
(45) Date of Patent: Oct. 11, 2016

(54) TRAINLINE COMMUNICATION NETWORK ACCESS POINT INCLUDING FILTER

(71) Applicant: Electro-Motive Diesel, Inc., La Grange, IL (US)

(72) Inventor: Mark Alan Fanara, Blue Springs, MO (US)

(73) Assignee: Electro-Motive Diesel, Inc., La Grange, IL (US)

(*) Notice: Subject to any disclaimer, the term of this patent is extended or adjusted under 35 U.S.C. 154(b) by 322 days.

(21) Appl. No.: 13/974,733

(22) Filed: Aug. 23, 2013

(65) Prior Publication Data

US 2015/0057847 A1    Feb. 26, 2015

(51) Int. Cl.
  *B61L 15/00*    (2006.01)
  *H04L 1/00*    (2006.01)
  *B61C 17/12*    (2006.01)

(52) U.S. Cl.
  CPC ............ *B61L 15/0072* (2013.01); *B61C 17/12* (2013.01); *B61L 15/0036* (2013.01); *H04L 1/0002* (2013.01)

(58) Field of Classification Search
  None
  See application file for complete search history.

(56) References Cited

U.S. PATENT DOCUMENTS

| | | | |
|---|---|---|---|
| 3,093,802 A | 6/1963 | Chow | |
| 4,012,603 A | 3/1977 | Araseki et al. | |
| 4,041,470 A * | 8/1977 | Slane | B60L 3/12 246/169 R |
| 4,383,243 A | 5/1983 | Kruegel et al. | |
| 4,556,866 A | 12/1985 | Gorecki | |
| 4,578,818 A | 3/1986 | Claydon | |
| 4,721,923 A | 1/1988 | Bares et al. | |
| 4,724,396 A | 2/1988 | Taylor, Jr. et al. | |
| 4,815,106 A | 3/1989 | Propp et al. | |
| 4,860,308 A | 8/1989 | Kamerman et al. | |
| 5,351,272 A | 9/1994 | Abraham | |

(Continued)

FOREIGN PATENT DOCUMENTS

| | | |
|---|---|---|
| DE | 421 4821 | 11/1992 |
| DE | 195 01 887 | 7/1995 |

(Continued)

OTHER PUBLICATIONS

U.S. Appl. No. 14/250,613 by Neil Keith Habermehl, filed Apr. 11, 2014, entitled "Train Communication Network."

(Continued)

*Primary Examiner* — Thomas G Black
*Assistant Examiner* — Peter D Nolan
(74) *Attorney, Agent, or Firm* — Finnegan, Henderson, Farabow, Garrett & Dunner, LLP; Uchendu O. Anyaso

(57) ABSTRACT

A trainline communication network access point has an intra-consist electrical cable connection point coupled to a transmission path and an intra-consist electrical cable, a processor, and a filter arrangement. The processor generates a data signal capable of transmitting network data over the intra-consist electrical cable. The processor determines from a plurality of possible transmit frequencies masked frequencies and non-masked frequencies and communicate the data signal on the transmission path on at least one of the non-masked frequencies and prevents communication of the data signal on the transmission path at the masked frequencies. The filter arrangement is disposed on the transmission path between the processor and the intra-consist electrical cable connection point and filters at least one of the masked frequencies from the transmission path.

20 Claims, 4 Drawing Sheets

(56) References Cited

U.S. PATENT DOCUMENTS

| | | |
|---|---|---|
| 5,446,918 A | 8/1995 | Lamy |
| 5,651,517 A | 7/1997 | Stevens et al. |
| 5,706,191 A | 1/1998 | Bassett et al. |
| 5,717,685 A | 2/1998 | Abraham |
| 5,777,545 A | 7/1998 | Patel et al. |
| 5,777,547 A | 7/1998 | Waldrop |
| 5,818,127 A | 10/1998 | Abraham |
| 5,969,643 A | 10/1999 | Curtis |
| 5,986,577 A | 11/1999 | Bezos |
| 6,114,974 A | 9/2000 | Halvorson |
| 6,163,089 A | 12/2000 | Kull |
| 6,311,045 B1 | 10/2001 | Domokos |
| 6,373,375 B1 | 4/2002 | Hoetzel et al. |
| 6,392,368 B1 | 5/2002 | Deller et al. |
| 6,392,562 B1 | 5/2002 | Boston et al. |
| 6,408,766 B1 | 6/2002 | McLaughlin et al. |
| 6,421,587 B2 | 7/2002 | Diana et al. |
| 6,442,195 B1 | 8/2002 | Liu et al. |
| 6,490,523 B2 | 12/2002 | Doner |
| 6,553,838 B2 | 4/2003 | Amini |
| 6,567,648 B1 | 5/2003 | Ahn et al. |
| 6,587,739 B1 | 7/2003 | Abrams et al. |
| 6,595,045 B1 | 7/2003 | Fuglewicz et al. |
| 6,972,670 B2 | 12/2005 | LaDuc et al. |
| 6,995,658 B2* | 2/2006 | Tustison ............... H04B 3/548 340/12.38 |
| 7,006,523 B2 | 2/2006 | Binder |
| 7,021,588 B2 | 4/2006 | Hess, Jr. et al. |
| 7,113,752 B2 | 9/2006 | Leinonen et al. |
| 7,182,411 B2 | 2/2007 | Levy et al. |
| 7,206,320 B2 | 4/2007 | Iwamura |
| 7,336,156 B2 | 2/2008 | Arita et al. |
| 7,499,682 B2 | 3/2009 | Rozenblit et al. |
| 7,634,240 B2 | 12/2009 | Milzlaff et al. |
| 7,893,557 B2 | 2/2011 | Davis et al. |
| 7,933,420 B2 | 4/2011 | Copley et al. |
| 8,036,402 B2 | 10/2011 | Furge |
| 8,068,616 B2 | 11/2011 | Copley et al. |
| 8,140,027 B2 | 3/2012 | Ozgun et al. |
| 8,160,520 B2 | 4/2012 | Srinivasan et al. |
| 8,232,666 B2 | 7/2012 | Rocamora et al. |
| 8,305,229 B1 | 11/2012 | Gard |
| 8,306,489 B2 | 11/2012 | Schwarzmueller et al. |
| 8,340,318 B2 | 12/2012 | Copley et al. |
| 8,364,189 B2 | 1/2013 | Mintah et al. |
| 8,447,255 B2 | 5/2013 | Asokan |
| 8,462,880 B2* | 6/2013 | Lin ..................... H04B 3/30 375/257 |
| 8,462,902 B1* | 6/2013 | Barnickel, Jr. ......... H04B 3/54 370/389 |
| 8,842,767 B2* | 9/2014 | Esmailian ..................... 375/229 |
| 2002/0011923 A1 | 1/2002 | Cunningham et al. |
| 2002/0101882 A1 | 8/2002 | Kim |
| 2002/0167398 A1 | 11/2002 | Strasser |
| 2003/0195668 A1* | 10/2003 | Radtke ............... H04B 3/548 701/1 |
| 2004/0223275 A1 | 11/2004 | Yanagida et al. |
| 2004/0261101 A1 | 12/2004 | Iwamura |
| 2005/0013320 A1 | 1/2005 | Binder |
| 2005/0085259 A1 | 4/2005 | Conner et al. |
| 2005/0085960 A1* | 4/2005 | Lumbis ............... B60T 8/1705 701/19 |
| 2005/0143868 A1 | 6/2005 | Whelan |
| 2006/0025903 A1 | 2/2006 | Kumar |
| 2006/0170285 A1 | 8/2006 | Morimitsu et al. |
| 2007/0136050 A1 | 6/2007 | Tourwe |
| 2007/0282494 A1 | 12/2007 | Moffitt et al. |
| 2007/0286079 A1 | 12/2007 | Mollenkopf et al. |
| 2008/0003962 A1 | 1/2008 | Ngai |
| 2008/0195259 A1 | 8/2008 | Davis et al. |
| 2008/0211663 A1 | 9/2008 | Mansfield et al. |
| 2008/0298384 A1 | 12/2008 | Beaucage |
| 2009/0042436 A1 | 2/2009 | Emoto et al. |
| 2009/0287496 A1 | 11/2009 | Thyssen et al. |
| 2010/0045447 A1 | 2/2010 | Mollenkopf et al. |
| 2010/0235022 A1 | 9/2010 | Siddappa et al. |
| 2010/0241295 A1* | 9/2010 | Cooper ................ B60T 13/665 701/19 |
| 2010/0256842 A1 | 10/2010 | Liberatore |
| 2011/0093144 A1* | 4/2011 | Goodermuth ......... B60T 13/665 701/20 |
| 2011/0126732 A1* | 6/2011 | Lumbis ................ B60T 17/228 105/3 |
| 2012/0083902 A1* | 4/2012 | Daum .................... H04B 3/548 700/3 |
| 2012/0095580 A1* | 4/2012 | Zhang .................... G10L 21/02 700/94 |
| 2012/0163201 A1 | 6/2012 | Williams et al. |
| 2013/0038424 A1 | 2/2013 | Katar et al. |
| 2013/0077801 A1 | 3/2013 | Tarnowski |
| 2013/0109334 A1* | 5/2013 | Kwon .................. H04B 1/0475 455/114.3 |
| 2013/0261842 A1* | 10/2013 | Cooper ............... B61L 15/0081 701/1 |
| 2013/0271342 A1 | 10/2013 | Shen |
| 2013/0320154 A1 | 12/2013 | Brown |
| 2013/0323939 A1 | 12/2013 | Brown |

FOREIGN PATENT DOCUMENTS

| | | |
|---|---|---|
| DE | 100 44 088 | 4/2002 |
| DE | 202007008825 | 8/2007 |
| EP | 0 968 897 | 1/2000 |
| EP | 1 010 602 | 6/2000 |
| EP | 1 065 127 | 1/2001 |
| EP | 1 253 725 | 10/2002 |
| EP | 1 306 283 | 5/2003 |
| EP | 1 487 128 | 12/2004 |
| GB | 109 7125 | 12/1967 |
| GB | 2 450 520 | 12/2008 |
| JP | 07/508609 | 9/1995 |
| JP | 11/317697 | 11/1999 |
| JP | 2004/235752 | 8/2004 |
| JP | 2004/241997 | 6/2005 |
| JP | 2005/176131 | 6/2005 |
| WO | WO 94/01949 | 1/1994 |
| WO | WO 2004/054224 | 6/2004 |
| WO | WO 2006/075767 A3 | 7/2006 |

OTHER PUBLICATIONS

U.S. Appl. No. 14/250,586 by Neil Keith Habermehl, filed Apr. 11, 2014, entitled "Train Communication Network."

U.S. Appl. No. 14/250,641 by Neil Keith Habermehl, filed Apr. 11, 2014, entitled "Train Communication Network."

Amirshahi, Pouyan, et al., "High-Frequency Characteristics of Overhead Multiconductor Power Lines for Broadband Communications," IEEE Journal on Selected Areas in Communications, vol. 24, No. 7, Jul. 2006, p. 1292.

Carcelle, Xavier, "Power Line Communications in Practice," Hybrid PLC (2009), p. 304.

Dai, Huaiyu, et al., "Advanced Signal Processing for Power Line Communications," *IEEE Communications Magazine,* May 2003, p. 100.

Hailes, S., "Modern telecommunications systems for train control," The 11$^{th}$ IET Professional Development Course on Railway Signalling and Control Systems, Jun. 2006, pp. 185-192.

IEEE Standard for Communications Protocol Aboard Trains, IEEE Std 1473-1999.

Kamata, Keiichi, "T-Ethernet: The Next International Standard Candidate for Train Communication Network." 2008.

Kirrmann, Hubert, et al., "The IEC/IEEE Train Communication Network," IEEE (2001).

Latchman, Haniph A., et al., "Homeplug AV and IEEE 1901: A Handbook for PLC Designers and Users," IEEE Press, p. 316.

Liu, Er, et al., "Broadband Powerline Channel and Capacity Analysis," IEEE (2005) p. 7.

Liu, Er, et al., "Powerline Communication Over Special Systems," IEEE (2005), p. 167.

(56) References Cited

OTHER PUBLICATIONS

"Nexans signaling cable enhances," *Railway Gazette International;* Apr. 2006; 162, 4; ProQuest, p. 206.

PM4380 Analog Front End for VDSL2/ADSL2+, Preliminary Product Brief, PMC-2060187, Issue 3, PMC-Sierra, Inc. (2007).

Roden, Andrew, "Duotrack signals S&T cabling revolution," *International Railway Journal;* Jul. 2007; 47, 7; ABI/INFORM Complete, p. 38.

Russo, D., et al., "A New Approach for Train Passenger Information Systems," presented at WCRR 2008 Seoul Korea, May 18-22, 2008.

Swanson, John D., "Advanced Light Rail Vehicle Communication Systems Design," Proceedings of the 2004 ASME/IEEE Joint Rail Conference, Apr. 6-8, 2004, p. 213.

Trainline communications—trainline communication system specifications—Vehicle Track Systems Newletter, *Railway Age,* Dec. 1994.

U.S. Appl. No. 13/563,220 by Aaron Gamache Foege et al., filed Jul. 31, 2012, entitled "Fuel Distribution System for Multi-Locomotive Consist".

U.S. Appl. No. 13/690,239 by James Robert Luecke et al., filed Nov. 30, 2012, entitled "Data Communication Systems and Methods for Locomotive Consists".

U.S. Appl. No. 13/903,367 by Tom Otsubo et al., filed May 24, 2013, entitled "Communication System for Use with Train Consist".

U.S. Appl. No. 13/903,395 by Tom Otsubo et al., filed May 24, 2013 entitled "Locomotive/Tender Car Communication System".

\* cited by examiner

TRAINLINE COMMUNICATION NETWORK ACCESS POINT INCLUDING FILTER

TECHNICAL FIELD

The present disclosure relates generally to a trainline communication network, and more particularly, to a trainline communication network access point including a filter.

BACKGROUND

A consist includes one or more locomotives that are coupled together to produce motive power for a train of rail vehicles. The locomotives each include one or more engines, which combust fuel to produce mechanical power. The engine(s) of each locomotive can be supplied with liquid fuel (e.g., diesel fuel) from an onboard tank, gaseous fuel (e.g., natural gas) from a tender car, or a blend of the liquid and gaseous fuels. The mechanical power produced by the combustion process is directed through a generator and used to generate electricity. The electricity is then routed to traction motors of the locomotives, thereby generating torque that propels the train. The locomotives can be connected together at the front of the train or separated and located at different positions along the train. For example, the consist can be positioned at the front, middle, or end of the train. In some instances, more than one consist can be included within a single train. The locomotives in a consist can be oriented in a forward-facing (or "long hood") direction or a backward-facing (or "short hood") direction. In some consists, the locomotives include computer systems for maintaining operations of the locomotive. These computer systems are sometimes disposed on the long hood side of the locomotive.

Because the locomotives of a consist must cooperate to propel the train, communication between the locomotives can be important. Historically, this communication has been facilitated through the use of an MU (Multi-Unit) cable that extends along the length of the consist. An MU cable is comprised of many different wires, each capable of carrying a discrete signal used to regulate a different aspect of consist operation. For example, a lead locomotive generates current within a particular one of the wires to indicate a power level setting requested by the train operator. When this wire is energized, the engines of all trail locomotives are caused to operate at a specific throttle value. In another example, when one locomotive experiences a fault condition, another of the wires is energized to alert the other locomotives of the condition's existence.

Although acceptable in some applications, the information traditionally transmitted via the MU cable may be insufficient in other applications. For example, during the fault condition described above, it can be important to know a severity and/or cause of the fault condition so that an appropriate response to the fault condition can be implemented in an effective and efficient manner. Additionally, as consist configurations become more complex, for example during multi-unit blended fuel operations (i.e., operations where gaseous fuel from a tender car is simultaneously supplied to multiple locomotives and mixed with diesel fuel at different rates), control of the locomotives and/or the tender car may require a greater amount of cooperation and/or more complex communication than can be provided via the MU cable.

One attempt to address the above-described problems is disclosed in U.S. Patent Publication 2010/0241295 of Cooper et al. that published on Sep. 23, 2010 ("the '295 publication"). Specifically, the '295 publication discloses a consist having a lead locomotive and one or more trail locomotives connected to each other via an MU cable. Each locomotive includes a computer unit, which, along with the MU cable, forms an Ethernet network in the train. With this configuration, network data can be transmitted from the computer unit in the lead locomotive to the computer units in the trail locomotives. The network data includes data that is packaged in packet form as data packets and uniquely addressed to particular computer units. The network data can be vehicle sensor data indicative of vehicle health, commodity condition data, temperature data, weight data, and security data. The network data is transmitted orthogonal to conventional non-network (i.e., command) data that is already being transmitted on the MU cable.

While the consist of the '295 publication may have improved communication between locomotives, it may still be less than optimal. In particular, it provides less than optimal filtering for preventing the transmission of network data at frequencies that could interfere with other equipment of the consist.

The system of the present disclosure solves one or more of the problems set forth above and/or other problems with existing technologies.

SUMMARY

In one aspect, the present disclosure is directed to a trainline communication network access point including an intra-consist electrical cable connection point coupled to a transmission path and an intra-consist electrical cable, a processor, and a filter arrangement. The processor generates a data signal capable of transmitting network data over the intra-consist electrical cable. The processor determines from a plurality of possible transmit frequencies masked frequencies and non-masked frequencies and communicates the data signal on the transmission path on at least one of the non-masked frequencies and prevents communication of the data signal on the transmission path at the masked frequencies. The filter arrangement is disposed on the transmission path between the processor and the intra-consist electrical cable connection point and filters at least one of the masked frequencies from the transmission path.

In another aspect, the present disclosure is directed to a method for communicating a data signal using a trainline communication network access point. The method includes generating a data signal capable of transmitting network data over an intra-consist electrical cable, and determining masked frequencies and non-masked frequencies from a plurality of possible transmit frequencies. The method further includes communicating the data signal on the transmission path on at least one of the non-masked frequencies and preventing communication of the data signal on the transmission path at the masked frequencies. A filter arrangement disposed on a transmission path between a trainline communication processor and an intra-consist electrical cable connection point connected to the intra-consist electrical cable filters at least one of the masked frequencies from the transmission path.

DETAILED DESCRIPTION

Figure 1:
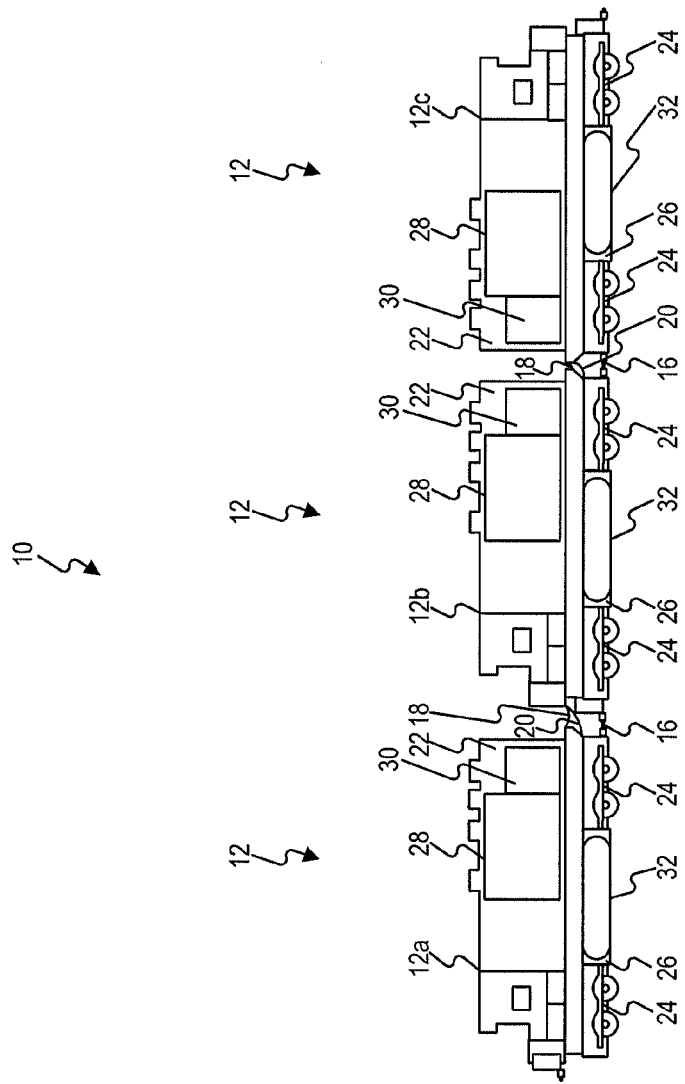
FIG. 1 is a pictorial illustration of an exemplary disclosed consist.

FIG. 1 illustrates an exemplary train consist 10 having one or more locomotives 12. In the disclosed embodiment, consist 10 has three different locomotives 12, including a lead locomotive 12a and two trailing locomotives 12b, 12c. It is contemplated, however, that consist 10 can include any number of locomotives 12 and other cars (e.g. tender cars), and that locomotives 12 can be located in any arrangement and in any orientation (e.g., forward-facing or rear-facing). Consist 10 can be located at the front of a train of other rail vehicles (not shown), within the train of rail vehicles, or at the end of the train of rail vehicles. It is also contemplated that more than one consist 10 can be included within a single train of rail vehicles, if desired, and/or that consist 10 can travel at times without a train of other rail vehicles.

Each locomotive 12 can be connected to an adjacent locomotive 12 in several different ways. For example, locomotives 12 can be connected to each other via a mechanical coupling 16, one or more fluid couplings 18, and one or more electrical couplings 20. Mechanical coupling 16 can be configured to transmit tractive and braking forces between locomotives 12. Fluid couplings 18 may be configured to transmit fluids (e.g., fuel, coolant, lubrication, pressurized air, etc.) between locomotives 12. Electrical couplings 20 can be configured to transmit power and/or data (e.g., data in the form of electrical signals) between locomotives 12. In one example, electrical couplings 20 include an intra-consist electrical cable, such as a MU cable, configured to transmit conventional command signals and/or electrical power. In another example, electrical couplings 20 include a dedicated data link configured to transmit packets of data (e.g., Ethernet data). In yet another example, the data packets can be transmitted via the intra-consist electrical cable. It is also contemplated that some data can be transmitted between locomotives 12 via a combination of the intra-consist electrical cable, the dedicated data link, and/or other means (e.g., wirelessly), if desired.

Each locomotive 12 can include a car body 22 supported at opposing ends by a plurality of trucks 24 (e.g., two trucks 24). Each truck 24 can be configured to engage a track (not shown) via a plurality of wheels, and to support a frame 26 of car body 22. Any number of engines 28 can be mounted to frame 26 within car body 22 and drivingly connected to a generator 30 to produce electricity that propels the wheels of each truck 24. Engines 28 can be internal combustion engines configured to combust a mixture of air and fuel. The fuel can include a liquid fuel (e.g., diesel) provided to engines 28 from a tank 32 located onboard each locomotive 12 or via fluid couplings 18, and/or a blended mixture of the liquid and gaseous fuels.

Figure 2:
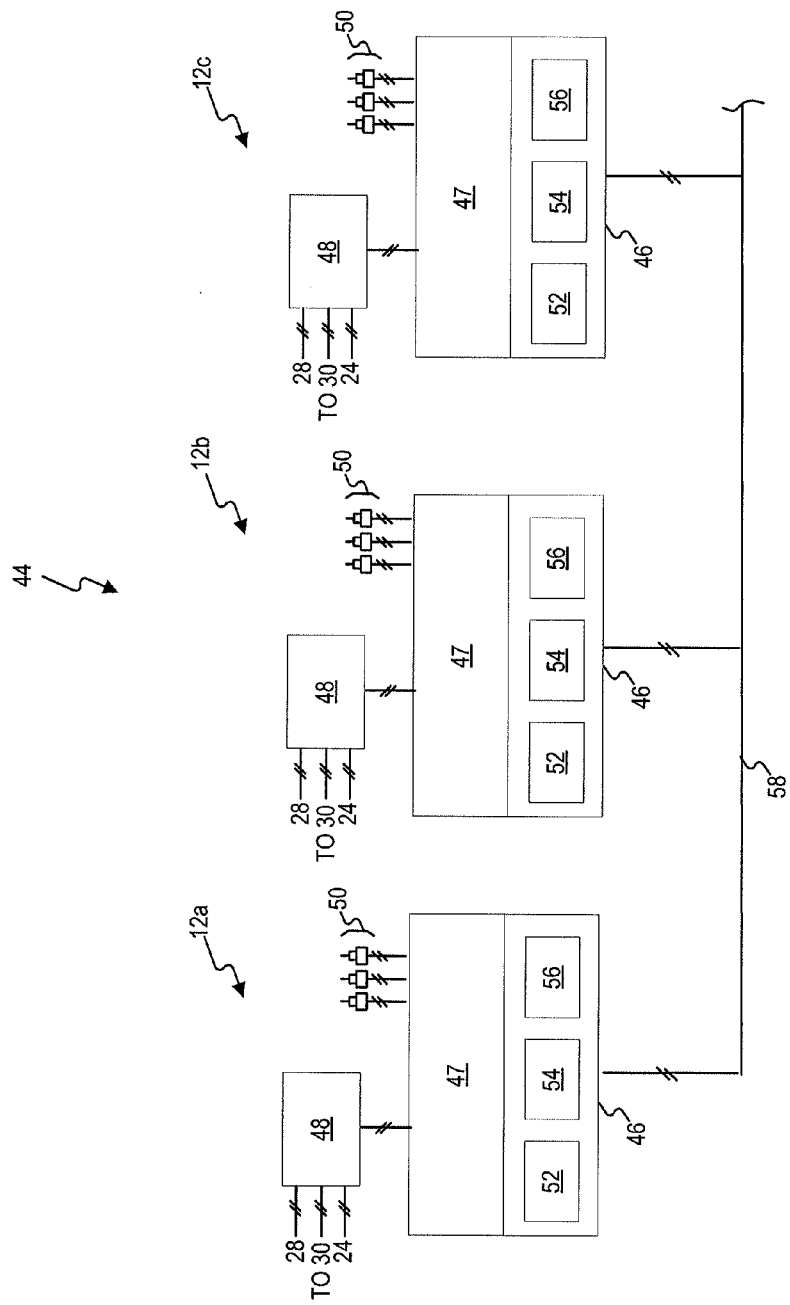
FIG. 2 is a diagrammatic illustration of an exemplary disclosed communication system that may be used in conjunction with the consist of FIG. 1.

As shown in FIG. 2, consist 10 can be equipped with a communication system 44 that facilitates coordinated control of locomotives 12. Communication system 44 can include, among other things, an access point 46 for each locomotive 12. Each access point 46 can be connected to one or more wired and/or wireless networks, and used to communicate command signals and/or data between controllers 48 of each rail vehicle and various other network components 50 (e.g., sensor, valves, pumps, heat exchangers, accumulators, regulators, actuators, GPS components, etc.) that are used to control locomotives 12. Access points 46 can be connected to each other via electrical couplings 20 (e.g., via the intra-consist electrical cable, via the dedicated data link, and/or wirelessly). Access points 46 can be connected to a local area network hub ("LAN hub") 47 that facilitates communication between the controllers 48, the network components 50, and access points 46.

Each access point 46 can include an inter-consist router ("IC router") 52, an Ethernet bridge 54, and an MU modem 56, as well as conventional computing components known in the art (not shown) such as a processor, input/output (I/O) ports, a storage, a memory. The I/O ports may facilitate communication between the associated access point 46 and the LAN hub 47. In some embodiments, the I/O ports may facilitate communication between the associated access point 46 and one or more of network components 50.

Likewise, IC router 52 can facilitate communication between different access points 46 of locomotives 12 that are connected to each other via electrical couplings 20. In some embodiments, IC router 52 can provide a proxy IP address corresponding to controllers 48 and network components 50 of remote locomotives. For example, IC router 52 can provide a proxy IP address for one of network components 50 of locomotive 12b so controller 48 of locomotive 12a can communicate with it. The IC router 52 can include, or be connected to, an Ethernet bridge 54 that can be configured to translate network data to an electrical signal capable of being sent through intra-consist electrical cable 58. Ethernet bridge 54 can include or be connected to MU modem 56. MU modem 56 can be configured to modulate a carrier signal sent over intra-consist electrical cable 58 with the electrical signal received from Ethernet bridge 54 to transmit network data between access points 46. MU modem 56 can also be configured to demodulate signals received from access points 46 and send the demodulated signals to Ethernet bridge 54 for conversion to network data destined to controller 48 or network components 50. In some embodiments, MU modem 56 sends network data orthogonal to data traditionally transmitted over intra-consist electrical cable 58 (e.g., control data). Although FIG. 2 illustrates IC router 52, Ethernet bridge 54, and MU modem 56 as separate components, in some embodiments, one component can perform the functionality of two components. For example, Ethernet bridge 54 may perform the operations described above with respect to IC router 52, or Ethernet bridge 54 can include, or perform the operations of, MU modem 56.

In some embodiments, access point 46, IC router 52, Ethernet bridge 54, and/or MU modem 56 can include a processor, storage, and/or memory (not shown). The processor can include one or more processing devices, such as microprocessors and/or embedded controllers. The storage can include volatile or non-volatile, magnetic, semiconductor, tape, optical, removable, non-removable, or other type of computer-readable medium or computer-readable storage device. The storage can be configured to store programs and/or other information that can be used to implement one or more of the processes discussed below. The memory can include one or more storage devices configured to store information.

Each controller 48 can be configured to control operational aspects of its related rail vehicle. For example, controller 48 of lead locomotive 12a can be configured to control operational aspects of its corresponding engine 28, generator 30, traction motors, operator displays, and other associated components. Likewise, the controllers 48 of trail locomotives 12b and 12c can be configured to control operational aspects of their corresponding engines 28, generators 30, traction motors, operator displays, and other associated components. In some embodiments, controller 48 of lead locomotive can be further configured to control operational aspects of trail locomotives 12b and 12c, if desired. For example, controller 48 of lead locomotive 12a can send commands through its access point 46 to the access points of trail locomotives 12b and 12c.

Each controller 48 can embody a single microprocessor or multiple microprocessors that include a means for controlling an operation of the associated rail vehicle based on information obtained from any number of network components 50 and/or communications received via access points 46. Numerous commercially available microprocessors can be configured to perform the functions of controller 48. Controller 48 can include a memory, a secondary storage device, a processor, and any other components for running an application. Various other circuits may be associated with controller 48 such as power supply circuitry, signal conditioning circuitry, solenoid driver circuitry, and other types of circuitry.

The information obtained by a particular controller 48 via access points 46 and/or network components 50 can include performance related data associated with operations of each locomotive 12 ("operational information"). For example, the operational information can include engine related parameters (e.g., speeds, temperatures, pressures, flow rates, etc.), generator related parameters (e.g., speeds, temperatures, voltages, currents, etc.), operator related parameters (e.g., desired speeds, desired fuel settings, locations, destinations, braking, etc.), liquid fuel related parameters (e.g., temperatures, consumption rates, fuel levels, demand, etc.), gaseous fuel related parameters (e.g., temperatures, supply rates, fuel levels, etc.), and other parameters known in the art.

The information obtained by a particular controller 48 via access points 46 and/or network components 50 can also include identification data of the other rail vehicles within the same consist 10. For example, each controller 48 can include stored in its memory the identification of the particular rail vehicle with which controller 48 is associated. The identification data can include, among other things, a type of rail vehicle (e.g., make, model, and unique identification number), physical attributes of the associated rail vehicle (e.g., size, load limit, volume, power output, power requirements, fuel consumption capacity, fuel supply capacity, etc.), and maintenance information (e.g., maintenance history, time until next scheduled maintenance, usage history, etc.). When coupled with other rail vehicles within a particular consist 10, each controller 48 can be configured to communicate the identification data to the other controllers 48 within the same consist 10. Each controller 48, can be configured to selectively affect operation of its own rail vehicle based on the obtained identification data associated with the other rail vehicles of consist 10.

In some embodiments, controllers 48 can be configured to affect operation of their associated rail vehicles based on the information obtained via access points 46 and/or network components 50 and one or more maps stored in memory. Each of these maps may include a collection of data in the form of tables, graphs, and/or equations. Controllers 48 can be configured to affect operation of their associated locomotives based on the position within a locomotive consist. The position of the locomotive associated with controller 48 can be used with the one or more maps to control the operation of the locomotive. For example, a map of throttle settings can be stored in the memory of controller 48. The map of throttle settings can include a mapping of consist position to throttle setting. For example, when the locomotive of controller 48 is the lead locomotive (e.g., in first position in the consist) the map may indicate that controller 48 should set the throttle to Notch 4, and when the locomotive of controller 48 is the third trail locomotive (e.g., in fourth position in the consist), the map may indicate that controller 48 should set the throttle to Notch 2.

According to some embodiments, access point 46 can include one or more components for filtering signals transmitted on intra-consist electrical cable 58. Filtering of transmitted signals can be important to prevent interference with components operating a certain frequencies. For example, personnel working on consist 10 may make use of hand-held communication devices that operate over radio waves at certain frequencies. When signals are sent over intra-consist electrical cable 58 on those same frequencies, the signals can interfere with the communication between hand-held communication devices. In addition, communication between hand-held communication devices can interfere with data signals sent over intra-consist electrical cable 58. Thus, it can be advantageous to prevent communication system 44 from using one or more frequencies that interfere with other devices (e.g., hand-held communication devices) operating on or near consist 10.

In conventional embodiments, preventing communication system 44 from using certain frequencies can be done using an amplitude map. An amplitude map can be a data structure that can be read by one or more components of access point 46 to determine the signal amplitude for various carrier frequencies that are used to send data over intra-consist electrical cable 58. To mask a frequency from use by communication system 44, the corresponding amplitude for the masked frequency can be set to zero in the amplitude map. Zeroing the masked frequency can be referred to as "notching" the frequency. Due to the inefficient notching mechanism provided by conventional embodiments, conventional embodiments require that the amplitude map also notch several frequencies close to the frequency that is to be masked. For example, when masking a 1000 MHz frequency, the amplitude map may notch 1000 MHz as well as frequency ranges from 980 MHz-1020 MHz. Notching frequency bands that are adjacent to the masked frequency can create a loss in bandwidth that can be undesirable when large amounts of data are being communicated between locomotives 12 of consist 10 or when a large number of notches are required. Accordingly, the disclosed communication system 44 provides a trainline communication network access point including a filter arrangement designed to filter desired masked frequencies thereby allowing use of one or more frequencies that would need to be notched in conventional embodiments.

Figure 3:
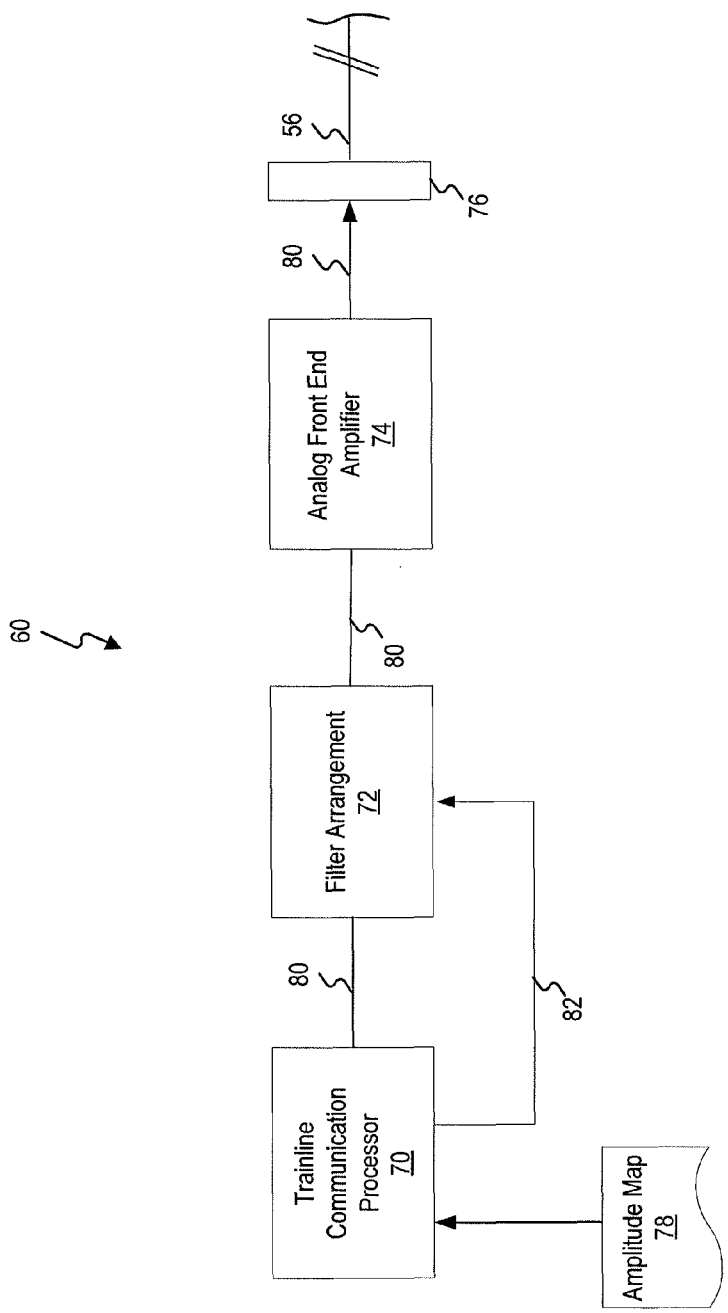
FIG. 3 is a diagrammatic illustration of an exemplary trainline communication network access point for use with the communication system of FIG. 2.

FIG. 3 is an illustration of an exemplary trainline communication network access point 60 for use within communication system 44. For ease of discussion, FIG. 3 discloses exemplary components of trainline communication network access point 60 that can be used to filter signals that trainline communication network access point 60 transmits, but trainline communication network access point 60 can contain additional components that are not described with respect to FIG. 3. For example, trainline communication network access point 60 can contain one or more components of access point 46 as described above with respect to FIG. 2. Further, one or more components of trainline communication network access point 60 can be disposed within one of the components of access point 46 as described above. For example, the components of trainline communication network access point 60 could be disposed within IC router 52, Ethernet bridge 54, or MU modem 56. In some embodiments, trainline communication network access point 60 can include a motherboard with one or more expansion slots for accepting daughtercards to enhance its functionality, and the operation of one or more components of trainline communication network access point 60 can be embodied on a daughtercard configured to interface with the motherboard. For example, filter arrangement 72 can be embodied as a daughtercard.

According to some embodiments, trainline communication network access point 60 operates to increase bandwidth of communication system 44. Trainline communication network access point 60 can include several components such as trainline communication processor 70, filter arrangement 72, analog front end amplifier 74, and intra-consist electrical cable connection point 76. The trainline communication network access point 60 can be connected by signal paths that are configured to transmit or receive digital or analog signals between the components of trainline communication network access point 60. For example, trainline communication access point 60 can include transmission signal path 80 and command signal path 82.

Trainline communication processor 70 can perform operations to enable trainline communication network access point 60 to perform network communications over intra-consist electrical cable 58. Trainline communication processor 70 can receive incoming signals via a receive path (not shown). The incoming signals can include a modulated signal containing network data to be processed by trainline communication processor 70, or some other component of access point 46. Conventionally, analog front end amplifier 74 receives transmit signals on transmission signal path 80 and amplifies or attenuates the signals before they are sent to intra-consist electrical cable connection point 76 for communication over intra-consist electrical cable 58.

In some embodiments, trainline communication processor 70 can perform or control operations for modulating or demodulating signals that communicate network data over intra-consist electrical cable 58. Trainline communication processor 70 can determine masked and non-masked carrier frequencies used for modulation and demodulation based on amplitude map 78. As described above, amplitude map 78 can include a data structure specifying the amplitudes of frequencies used for modulation in communication system 44. Amplitude map 78 can be a data structure stored in memory, a database, or a configuration file, for example, that is accessible locally or remotely by trainline communication processor 70. When trainline communication processor 70 generates a data signal capable of transmitting network data over intra-consist electrical cable 58, it can refer to amplitude map 78 to determine the proper amplitude for the data signal. As described above, frequencies that trainline communication processor 70 cannot use to modulate data signals can be notched using amplitude map 78 by setting their respective amplitudes to zero.

Trainline communication network access point 60 can also include filter arrangement 72. Filter arrangement 72 can include one or more filters configured to allow or prevent signals of certain frequencies that are communicated on transmission signal path 80. The one or more filters of filter arrangement 72 can be band-pass filters, low-pass filters, high-pass filters, or notch (band-stop) filters. In some embodiments, filter arrangement 72 includes programmable filters that can be controlled to filter a first set of frequencies at one time and filter a second set of frequencies at a second time. For example, filter arrangement 72 can prevent transmission of signals at 1000 MHz and allow transmission of signals at 1500 MHz at a first time, and allow transmission of signals at 1000 MHz and prevent transmission of signals at 1500 MHz at a second time. The use of programmable filters allows filter arrangement 72 to adjust its filtering based on operational needs. Filter arrangement 72 can also include one or more non-programmable filters. Filter arrangement 72 can include analog filters, digital filters, or both.

Filter arrangement 72 can be connected to transmission signal path 80 and disposed between trainline communication processor 70 and analog front end amplifier 74 (as shown in FIG. 3). In such embodiments, filter arrangement 72 filters signals transmitted on transmission signal path 80 before the signals are amplified by analog front end amplifier 74. In some embodiments, filter arrangement 72 can be connected to transmission signal path 80 and disposed between analog front end amplifier 74 and intra-consist electrical cable connection point 76. In such embodiments, filter arrangement 72 filters signals transmitted on transmission signal path 80 after the signals are amplified by analog front end amplifier 74. In some embodiments, filter arrangement 72 can be connected to transmission signal path 80 and include a first arrangement of filters disposed between trainline communication processor 70 and analog front end amplifier 74 and a second arrangement of filters disposed between analog front end amplifier 74 and intra-consist electrical cable connection point 76. In such embodiments, filter arrangement 72 filters signals transmitted on transmission signal path 80 before and/or after the signals are amplified by analog front end amplifier 74.

In some embodiments, filter arrangement 72 can be controlled by trainline communication processor 70. Filter arrangement 72 can be connected to command signal path 82 and can detect control signals that are sent by trainline communication processor 70 on command signal path 82. The control signals can specify one or more frequencies to filter from the data signals transmitted on transmission signal path 80. Based on the detected control signals, filter arrangement 76 can set one or more programmable filters to prevent the communication of signals at the frequencies identified in the control signal. In some embodiments, trainline communication processor 70 determines masked frequencies (e.g., those are not to be used as carrier frequencies) and non-masked frequencies (e.g., those that can be used as carrier frequencies) by reading amplitude map 78. Based on the masked and non-masked frequencies determined from amplitude map 78, trainline communication processor 70 generates a control signal and communicates it to filter arrangement 72 on command signal path 82. In some embodiments, filter arrangement 72 can be configured to read amplitude map 78 and filter any frequencies that have been notched in it. Further operations of trainline communication network access point 60 are described in greater detail below with respect to FIG. 4.

INDUSTRIAL APPLICABILITY

The disclosed trainline communication network access point can be applicable to any consist that includes a plurality of rail cars, such as locomotives. The disclosed trainline communication network access point can provide more finely tuned notching of frequencies than that of conventional embodiments thereby increasing the potential bandwidth of a trainline communication system used for communication by locomotives in a consist. The operation of the disclosed trainline communication network access point will now be explained.

Figure 4:
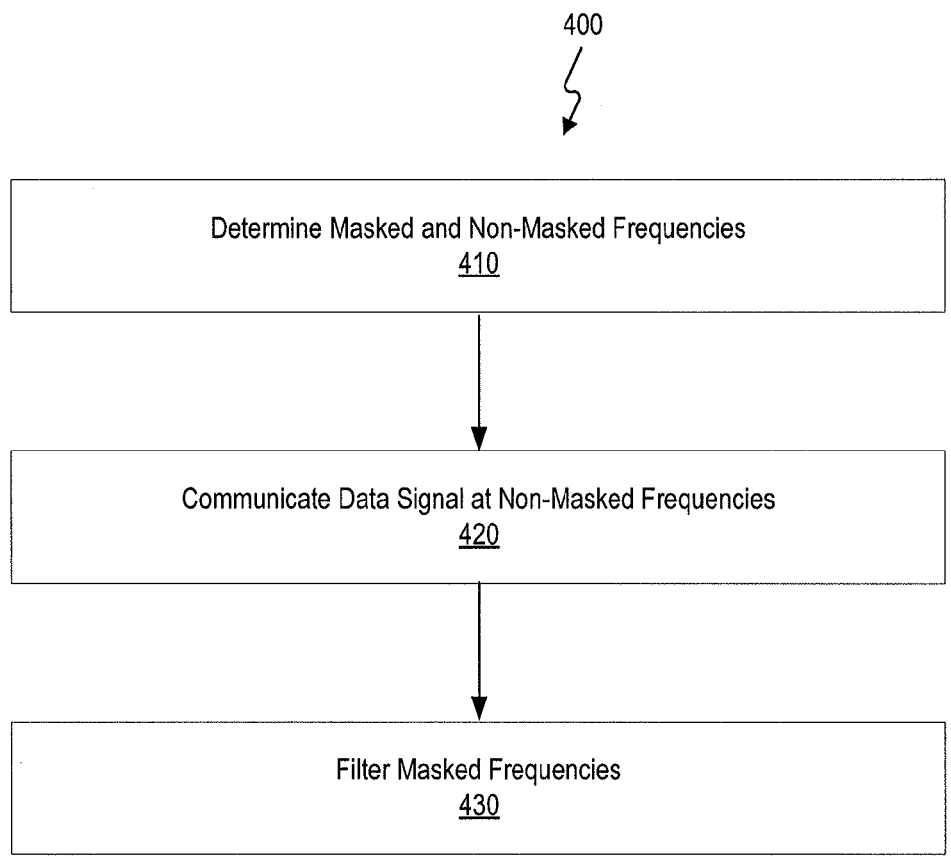
FIG. 4 is a flowchart illustrating an exemplary disclosed method for filtering data signals that can be performed by the trainline communication network access point of FIG. 3.

FIG. 4 is a flowchart illustrating an exemplary disclosed method 400 for filtering data that can be performed by one of the components illustrated in FIG. 3. During the operation of consist 10, trainline communication network access point 60 can perform method 400 to filter data signals using filter arrangement 72. Although the description that follows describes method 400 as being performed by trainline communication network access point 60, other components of access point 46 can perform one or more of the steps of method 400 in some embodiments.

Trainline communication network access point 60 begins method 400 by determining masked and non-masked frequencies (step 410). Masked frequencies can include those frequencies that can serve as carrier frequencies in communication system 44. Non-masked frequencies can include those frequencies that cannot serve as carrier frequencies in communication system 44 due to interference with other components of consist 10. Trainline communication network access point 60 can determine the masked and non-masked frequencies by accessing amplitude map 78 and determining whether any frequencies in amplitude map 78 are associated with a zero amplitude. Those frequencies in amplitude map 78 with zero amplitudes can be masked frequencies, and those frequencies in amplitude map 78 with non-zero amplitudes can be non-masked frequencies.

Next, trainline communication network access point 60 communicates a data signal at non-masked frequencies (step 420). As noted above, trainline communication network access point 60 can include trainline communication processor 70, which can generate the data signal and modulate it with a carrier frequency selected from the non-masked frequencies. The data signal is sent along transmission signal path 80 and filtered by filter arrangement 72 (step 430). Once filtered, the data signal can be communicated over intra-consist electrical cable 58 to a destination access point of another locomotive of consist 10.

Several advantages over the prior art may be associated with the trainline communication network access point. For example, the disclosed trainline communication network access point can prevent transmission of signals at frequencies that cause interference with other equipment operating on a locomotive consist. In addition, as described herein, the disclosed trainline communication network access point can include a filter arrangement that provides more finely tuned notching of frequencies thereby increasing the potential bandwidth of a trainline communication system used by locomotives in a consist.

It will be apparent to those skilled in the art that various modifications and variations can be made to the trainline communication network access point. Other embodiments will be apparent to those skilled in the art from consideration of the specification and practice of the disclosed trainline communication network access point. It is intended that the specification and examples be considered as exemplary only, with a true scope being indicated by the following claims and their equivalents.

What is claimed is:

1. A trainline communication network access point comprising:
   a transmission path;
   an intra-consist electrical cable connection point coupled to the transmission path and configured to couple to an intra-consist electrical cable;
   a processor configured to:
      generate a data signal capable of transmitting network data over the intra-consist electrical cable,
      determine, from a plurality of possible transmit frequencies, masked frequencies and non-masked frequencies,
      communicate the data signal on the transmission path on at least one of the non-masked frequencies, and
      prevent communication of the data signal on the transmission path at the masked frequencies; and
   a filter arrangement disposed on the transmission path between the processor and the intra-consist electrical cable connection point, the filter arrangement configured to filter at least one of the masked frequencies from the transmission path.

2. The trainline communication network access point of claim 1 further including an analog front end amplifier connected to the transmission path and configured to amplify the data signal.

3. The trainline communication network access point of claim 2 wherein the filter arrangement is disposed on the transmission path between the processor and the analog front end amplifier.

4. The trainline communication network access point of claim 2 wherein the filter arrangement is disposed on the transmission path between the analog front end amplifier and the intra-consist electrical cable connection point.

5. The trainline communication network access point of claim 1 wherein the filter arrangement includes a plurality of filters.

6. The trainline communication network access point of claim 1 wherein the filter arrangement includes a programmable filter.

7. The trainline communication network access point of claim 6 wherein the processor is further configured to command the filter arrangement to filter the at least one of the masked frequencies from the transmission path.

8. The trainline communication network access point of claim 1 wherein the processor is configured to determine the masked frequencies and the non-masked frequencies based on an amplitude map.

9. The trainline communication network access point of claim 1 wherein the filter arrangement is configured to filter the at least one of the masked frequencies from the transmission path based on an amplitude map.

10. The trainline communication network access point of claim 1 wherein the trainline communication network access point is disposed within a locomotive.

11. A method of transmitting a signal using a trainline communication network access point, the method comprising:
   generating a data signal capable of transmitting network data over an intra-consist electrical cable,
   determining, from a plurality of possible transmit frequencies, masked frequencies and non-masked frequencies,
   communicating the data signal on the transmission path on at least one of the non-masked frequencies,
   preventing communication of the data signal on the transmission path at the masked frequencies; and
   filtering, with a filter arrangement disposed on a transmission path between a trainline communication processor and an intra-consist electrical cable connection point connected to the intra-consist electrical cable, at least one of the masked frequencies from the transmission path.

12. The method of claim 11 further including amplifying the data signal using an analog front end amplifier.

13. The method of claim 12 wherein the filter arrangement is disposed on the transmission path between the trainline communication processor and the analog front end amplifier.

14. The method of claim 12 wherein the filter arrangement is disposed on the transmission path between the analog front end amplifier and the intra-consist electrical cable connection point.

15. The method of claim 11 wherein the filter arrangement includes a plurality of filters.

16. The method of claim 11 wherein the filter arrangement includes a programmable filter.

17. The method of claim 16 further including commanding, with the trainline processor, the filter arrangement to filter the at least one of the masked frequencies from the transmission path.

18. The method of claim 11 wherein the masked frequencies and the non-masked frequencies are determined based on an amplitude map.

19. The method of claim 11 wherein the filter arrangement is configured to filter the at least one of the masked frequencies from the transmission path based on an amplitude map.

20. A locomotive consist comprising:
a locomotive;
an intra-consist electrical cable;
a trainline communication network access point disposed within the locomotive and connected to the intra-consist electrical cable, the trainline communication network access point comprising:
an intra-consist electrical cable connection point coupled to a transmission path and the intra-consist electrical cable;
a processor configured to:
generate a data signal capable of transmitting network data over the intra-consist electrical cable,
determine, from a plurality of possible transmit frequencies, masked frequencies and non-masked frequencies,
communicate the data signal on the transmission path on at least one of the non-masked frequencies, and
prevent communication of the data signal on the transmission path at the masked frequencies; and
a filter arrangement disposed on the transmission path between the processor and the intra-consist electrical cable connection point, the filter arrangement configured to filter at least one of the masked frequencies from the transmission path.

* * * * *